Feb. 28, 1928.
A. Y. DODGE
1,660,919
BRAKE SHOE
Filed Oct. 24, 1925      2 Sheets-Sheet 1
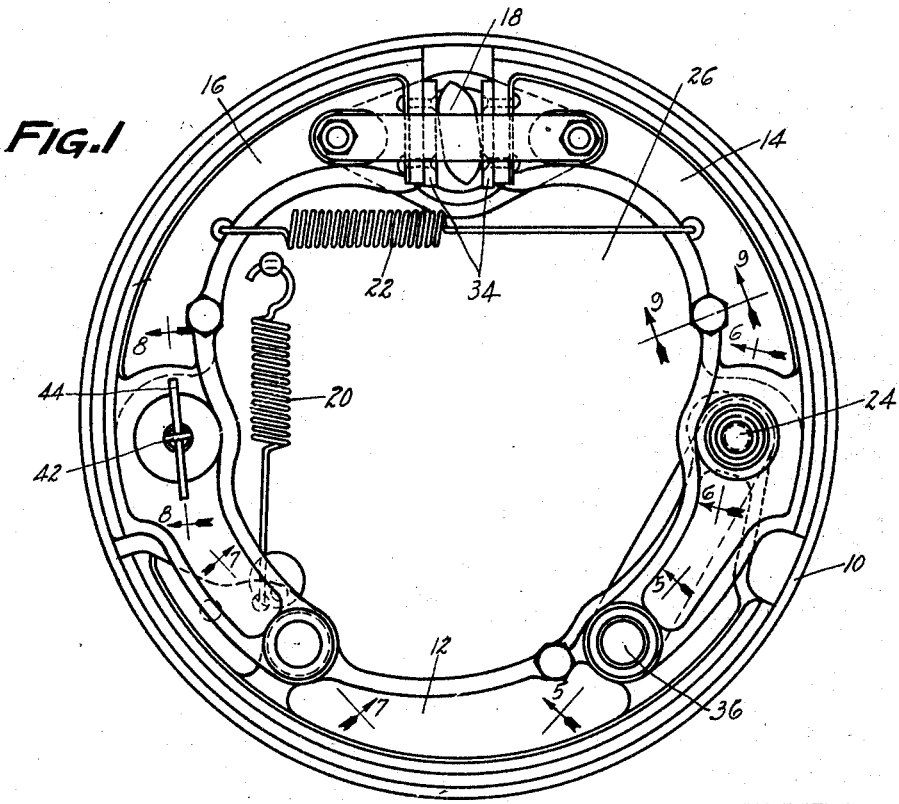
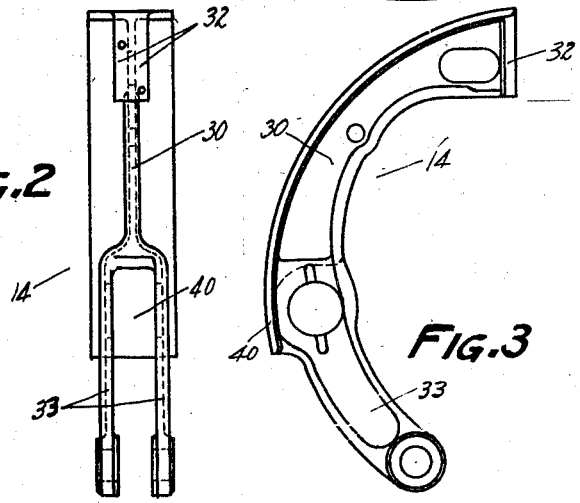
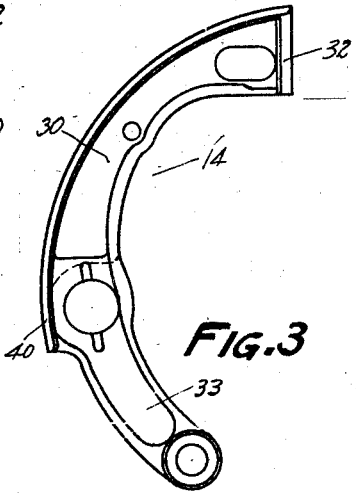
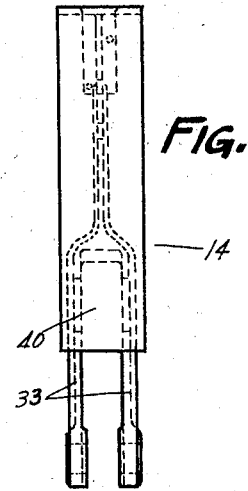
INVENTOR
ADIEL Y. DODGE
BY  M. W. McConkey
ATTORNEY Feb. 28, 1928.
A. Y. DODGE
1,660,919
BRAKE SHOE
Filed Oct. 24, 1925
2 Sheets-Sheet 2
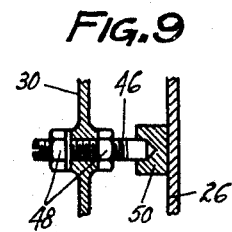
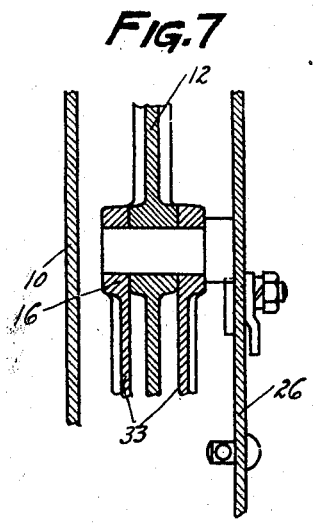
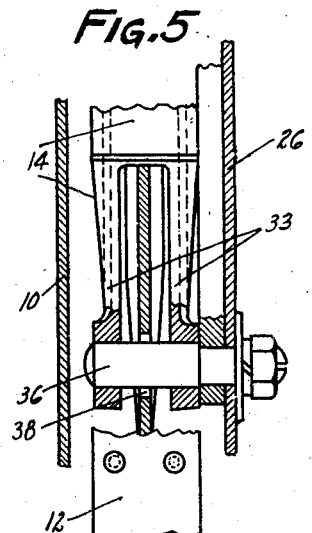
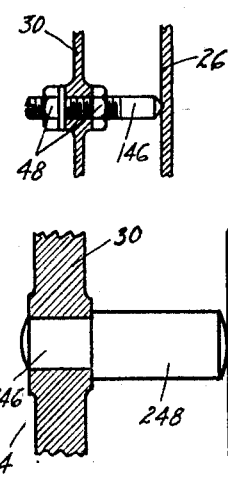
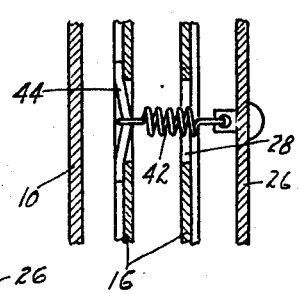
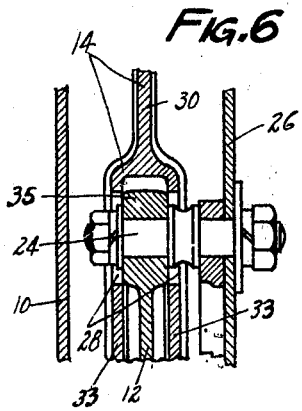
INVENTOR
ADIEL Y. DODGE
BY *Jn. W. McConkey*
ATTORNEY Patented Feb. 28, 1928.

1,660,919

UNITED STATES PATENT OFFICE.

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS.

BRAKE SHOE.

Application filed October 24, 1925. Serial No. 64,535.

This invention relates to brake shoes, and is illustrated as embodied in a three-shoe "Bendix" brake. An object of the invention is to provide a strong but inexpensive form of shoe capable of overlapping an adjacent shoe, to augment the area engaging the drum, by forming at the end of the shoe pivoted or anchored means overlapping said adjacent shoe, and preferably formed as spaced arms straddling the end of the adjacent shoe and offset from the curve of the friction part of the shoe so that it clears the end of the adjacent shoe.

Other features of the invention relate to a novel steady rest for positioning the shoe laterally, to an improved mounting for a cam wear plate, and to other desirable particular constructions which will be apparent from the following description of the illustrative shoes shown in the accompanying drawings, in which:

Fig. 1 is a vertical view of the brake, just inside the wheel, showing the brake shoes in side elevation;

Figs. 2, 3, and 4 are respectively inside, side, and outside elevations of one of the end shoes;

Fig. 5 is a partial view of the assembled shoes, broken away on the line 5—5 of Fig. 1 to show the manner of anchoring one of the end shoes.

Fig. 6 is a section on the line 6—6 of Fig. 1, showing the anchor of the central shoe;

Fig. 7 is a section on the line 7—7 of Fig. 1, showing the pivot connecting two of the shoes;

Fig. 8 is a section on the line 8—8 of Fig. 1, showing the spring holding one of the shoes laterally; and Figs. 9, 10, and 11 are on the line 9—9 of Fig. 1, showing different forms of steady rests.

The brake shown in Fig. 1, and in which the shoes may be used, includes a drum 10, within which are arranged a T-section central shoe 12, a reverse end shoe 14, and a servo end shoe 16. Preferably shoes 14 and 16 are identical and interchangeable. The shoes are expanded to apply the brake by means shown as a double cam 18, against the resistance of return springs 20 and 22. The shoes are preferably die-cast of aluminum or an aluminum alloy.

Shoe 12 is anchored at its right end (Fig. 1) on a pivot pin 24 carried by backing plate 26, and projecting through relatively large openings 28 in shoe 14, so that it does not interfere with the movement of that shoe.

Each of shoes 14 and 16 has a cylindrically-curved friction face, with a reinforcing web or flange 30, having oppositely-directed substantially radial flanges 32 at its end to which a cam wear plate 34 is riveted or otherwise secured, thus transmitting the brake-applying thrust of cam 18 directly to webs 30.

At the opposite end of each shoe, web 30 is offset from the central plane of the shoe, preferably being bifurcated to form spaced arms 33, to overlap the corresponding end of shoe 12. As illustrated in Figs. 5 and 6, it is preferable to form the inner faces of arms 33 as parallel planes slidably embracing the plane sides of a boss 35 on the end of shoe 12, thus positioning the end of shoe 12 laterally. Arms 33 of shoe 14 are pivoted at their ends on an anchor 36 carried by backing plate 26, and passing through a relatively large opening 38 in shoe 12.

A part 40 bridging the arms 33 of each of the shoes 14 and 16, at their bases, forms a continuation of the friction face of the shoe. Thus each of these shoes as illustrated is T-shaped in section for most of its length, but is channel-shaped at its end with the side flanges of the channel continued as spaced anchoring arms straddling the end of shoe 12. It should be noted that arms 33 are offset inwardly from the curve of the friction face (Figs. 1 and 3) to clear the end of shoe 12.

A spring 42 connected to backing plate 26, and to a pin 44 engaging shoe 16, urges this shoe laterally toward the backing plate. The shoes may be positioned laterally by suitable steady rests engaging the backing plate, and shown in detail in Figs. 9, 10, and 11. The one in Fig. 9 includes a post 46, on which nuts 48 are threaded to hold it adjustably with respect to web 30 of its shoe, and which enters a recess in a block 50 of fiber, slidably engaging the backing plate. The post 146 in Fig. 10 is of substantially the same construction, except that it is longer and has a rounded end engaging the backing plate directly, block 50 being omitted. Post 246, Fig. 11, has an unthreaded shank projecting into an opening in the web 30, and a rounded enlarged head 248 slidably engaging the backing plate and also serving to prevent the shank from coming out of the shoe.

While a number of shoes have been described in detail, it is not my intention to limit the scope of the claims to those particular shoes, or otherwise than by the terms of the appended claims. Part of the subject-matter herein claimed was disclosed in my copending application No. 723,836, filed July 2, 1924.

I claim:

1. A brake shoe T-shaped in cross section throughout most of its length, and having a steel wear plate at one end and having generally parallel spaced arms at its other end to straddle the end of an adjacent shoe.

2. A brake shoe T-shaped in cross section throughout most of its length, and having generally parallel spaced arms at its ends to straddle the end of an adjacent shoe.

3. A brake shoe T-shaped in cross section and having generally parallel spaced arms at its ends to straddle the end of an adjacent shoe, said arms having openings large enough for clearance about the anchor of the adjacent shoe.

4. A brake shoe T-shaped in cross section throughout most of its length, and having a wear plate at one end and a slot adjacent said end for the passage of a post supporting means confining the shoe laterally.

5. A brake shoe having a steady-rest adjustably mounted therein and engageable with the backing plate of a brake.

6. A brake shoe having a separate pin projecting from its side and constructed and arranged slidably to engage the backing plate of a brake.

7. A brake shoe carrying a rigid separate part of fiber spaced from its side and serving as a steady-rest slidably engaging the brake-backing plate.

8. A brake shoe channel-shaped at least at its end, to provide a cylindrical friction face bridging spaced flanges, with said flanges continued as spaced arms offset within the curve of the friction face to clear the friction face of an adjacent shoe and projecting a substantial distance to straddle the end of said adjacent shoe.

9. A brake shoe of T-section throughout most of its length and channel-shaped at its end, to provide at said end a cylindrical friction face bridging spaced flanges, with said flanges continued as spaced arms offset within the curve of the friction face to clear the friction face of an adjacent shoe and projecting a substantial distance to straddle the end of said adjacent shoe.

10. A brake shoe having a curved friction face and having at its end a part offset within the curve of the friction face to clear the end of an adjacent shoe and offset at one side of the center plane of the shoe to overlap without interference said end of said adjacent shoe.

11. A brake shoe having a curved friction face and having at its end a part offset within the curve of the friction face to clear the end of an adjacent shoe and offset at one side of the center plane of the shoe to overlap without interference said end of said adjacent shoe, and arranged to be pivotally mounted on a torque-taking device at the end of said offset part.

12. A brake shoe having a curved friction face and having at its end a part offset within the curve of the friction face to clear the end of an adjacent shoe and offset at one side of the center plane of the shoe to overlap without interference said end of said adjacent shoe, and said shoe having a stiffening flange opposite the friction face and of which said offset part forms a continuation at one end.

13. A brake shoe having a curved friction face and having at its end a part offset within the curve of the friction face to clear the end of an adjacent shoe and offset at one side of the center plane of the shoe to overlap without interference said end of said adjacent shoe, and arranged to be pivotally mounted on a torque-taking device at the end of said offset part, and said shoe having a stiffening flange opposite the friction face and of which said offset part forms a continuation at one end.

14. A brake shoe having a cylindrically-curved friction part backed by a central stiffening flange bifurcated near one end of the shoe before the end of the cylindrical part to form spaced arms offset at the end of the cylindrical part, from the curve of the friction part to clear the end of an adjacent shoe and adapted to straddle said end of said adjacent shoe.

15. A brake shoe having a cylindrically-curved friction part backed by a central stiffening flange offset from the central plane of the shoe at one end of the shoe to form anchoring means offset from the curve of the friction part to clear the end of an adjacent shoe and adapted to overlap said end of said adjacent shoe.

16. A brake shoe having a cylindrically-curved friction part backed by a central stiffening flange bifurcated at one end of the shoe to form spaced arms offset from the curve of the friction part to clear the end of an adjacent shoe and adapted to straddle said end of said adjacent shoe, together with a part bridging said arms at their bases and forming a continuation of the friction part.

17. A brake shoe having a cylindrically-curved friction part backed by a central stiffening flange bifurcated at one end of the shoe to form spaced arms offset from the curve of the friction part to clear the end of an adjacent shoe and adapted to straddle said end of said adjacent shoe, the arms having opposite large openings spaced from their ends to provide clearance for the anchor of said adjacent shoe.

18. A brake shoe having a cylindrically-curved friction part backed by a central stiffening flange offset from the central plane of the shoe at one end of the shoe to form anchoring means offset from the curve of the friction part to clear the end of an adjacent shoe and adapted to overlap said end of said adjacent shoe, the anchoring means having a large opening spaced from its end to provide clearance for the anchor of said adjacent shoe.

19. A brake shoe having a central stiffening web with oppositely-directed substantially radial flanges at one end, and a wear plate secured to the flanges and transmitting brake-applying thrust to said web.

20. A brake shoe having a curved friction face integral with a central stiffening web provided with oppositely directed substantially radial flanges at one end, and a wear plate secured to the flanges and transmitting brake-applying thrust to said web.

In testimony whereof, I have hereunto signed my name.

ADIEL Y. DODGE.